United States Patent [19]
Seitz et al.

[11] Patent Number: 6,059,884
[45] Date of Patent: May 9, 2000

[54] CONTROL SYSTEM OF A COATING APPARATUS

[75] Inventors: Kurt Seitz, Widnau; Horst Adams, St. Gallen; Markus Hasler, Montlingen, all of Switzerland

[73] Assignee: Mirror & Pictures Vermarktungs und Handels GmbH, Gotting, Germany

[21] Appl. No.: 09/106,482

[22] Filed: Jun. 29, 1998

[30] Foreign Application Priority Data

Sep. 1, 1997 [DE] Germany ............................ 197 38 141

[51] Int. Cl.$^7$ .................................................. B05C 11/00
[52] U.S. Cl. ............................................ 118/679; 118/708
[58] Field of Search .................................. 118/663, 668, 118/669, 679, 708

[56] References Cited

U.S. PATENT DOCUMENTS

| | | | |
|---|---|---|---|
| 4,614,300 | 9/1986 | Falcoff | 239/71 |
| 5,421,885 | 6/1995 | Trevisan | 118/308 |
| 5,702,209 | 12/1997 | Mauchle | 406/12 |
| 5,718,767 | 2/1998 | Crum et al. | 118/669 |
| 5,739,806 | 4/1998 | Hissen et al. | 345/115 |
| 5,843,515 | 12/1998 | Crum et al. | 427/8 |
| 5,876,803 | 3/1999 | Hissen et al. | 427/424 |

FOREIGN PATENT DOCUMENTS

| | | |
|---|---|---|
| 39 13 584 A1 | 10/1990 | Germany . |
| 42 31 766 A1 | 3/1994 | Germany . |
| 43 39 492 | 5/1994 | Germany . |
| 43 25 044 A1 | 2/1995 | Germany . |
| 43 39 748 A1 | 2/1995 | Germany . |

OTHER PUBLICATIONS

JOT, Journal Fur Oberflachentechnik, Aug. 1997.

"Lexikon der Kommunikations–und Informationstechnik", 1997, p. 292.

"Der Faktor Mensch ist nach wie vor entscheidend", JOT 1994, pp. 32,34,and 36.

"Robotereinsatz in der Automibilindustrie", Von Udo Grohmann, pp. 206–210.

*Primary Examiner*—James Sells
*Attorney, Agent, or Firm*—Faegre & Benson LLP

[57] ABSTRACT

The invention relates to a control system of a coating apparatus for a coating medium, such as powder or wet lacquer, comprising at least one coating device, in which a quantity measuring means for determining the amount of coating medium supplied to the coating device, a quantity control means for setting the quantity of the coating medium to be discharged by the coating device, and a digital control device for controlling the operation of the coating device are associated to the or any coating device, wherein the control device, the quantity measuring means and the quantity control means are connected to one another by a bus structure.

19 Claims, 6 Drawing Sheets

CONTROL SYSTEM OF A COATING APPARATUS

The present invention refers to a control system of a coating apparatus for a coating medium, such as powder or wet lacquer, comprising at least one coating device.

Conventional automated coating apparatus are controlled by stored program controls (SPC). A central computer unit is located inside a control box from which a plurality of electric and pneumatic lines extend to the sensors and actuators of the apparatus.

The current states of the sensors (e.g. feed cycle, level etc.) are cyclically detected by the central unit (sequential polling), the necessary reactions of the associated actuators are calculated and subsequently supplied to the actuators. As soon as the job spectrum becomes more extensive by integration of further sensors and actuators, an additional data flow through the SPC is generated which the SPC can no longer process from a certain extent onwards.

The critical data quantity is easily exceeded in larger coating systems having a plurality of coating apparatus including the associated sensors and actuators.

In conventional systems the SPC is the trouble area of the entire system due to its central position. Besides the enormous amount of wiring and lines needed (electric and pneumatic lines) for the control box structure and at the coating site, the individual programming of the system is very costly and difficult. When connecting new components, the central unit has to be newly programmed; during this time the system stands still.

If malfunctions of the SPC occur after initiation, great damage may occur by the failure of the entire system connected therewith.

Finally, the known stored program controls lack flexibility in particular in view of the integration of special customer requests.

Thus, it is the object of the invention to provide a new control system for a coating apparatus, which has a simple structure, which is flexible and is easily extendible in view of the number of coating devices and in view of monitoring and control, and which minimizes the use of expert knowledge for operating the apparatus. Additionally, the working expenditure for the projecting and assembling and the manufacturing costs shall be reduced.

This object is achieved by a control system of a coating apparatus comprising the features of claim 1. Further preferred embodiments of the control system are defined in the dependent claims.

The present invention provides a control system of a coating apparatus for a coating medium, such as powder or wet lacquer, comprising at least one coating device, in which a quantity measuring means for determining the amount of coating medium supplied to the coating device, a quantity control means for setting the quantity of the coating medium to be discharged by the coating device, and a digital control device for controlling the operation of the coating device are associated to the or any coating device, wherein the quantity measuring means and the quantity control means form one LON node each, which is connected to the digital control device via a bus structure, wherein the network nodes are LON nodes.

In a control system according to the invention, an independent quantity measuring means and a quantity control means for the coating medium—in particular coating powder and wet lacquer— as well as a digital control device are associated to the or any coating device of a coating apparatus, said digital control device automatically (open-loop and/or closed-loop) controlling the coating device. Said components are connected to one another through a unified LON bus structure.

The control system according to the invention enables the structure of an integrated modular coating system. Such a coating system can be used in simple hand apparatus as well as in complex automatic coating apparatus and can be adapted flexibly to the special requests of the user. This is enabled by the fact that the control device, contrary to an SPC system, is connected to the other components only via electric signal lines, and that due to the use of the LON bus structure, the wiring expenditure is minimized even for the smallest coating unit having one coating device only.

The principle of the control system according to the invention allows to decentralize the control, monitor and control functions in coating apparatus having a plurality of coating devices. For this purpose, the quantity measuring means and the quantity control means are designed as a kind of "intelligent" network nodes. The or each network node includes a sensor and/or actuator, an application-specific electronics, a control component and an interface to the bus. The bus connects these "intelligent" network nodes to a digital control device, so that a self-sufficient, i.e. a functional unit controlling itself, is generated. That means that the individual coating devices are no longer controlled centrally as in the prior art, but each coating device has "self-intelligence", enabling a complete decentralization of the control of the coating apparatus.

The control device may in turn form such a network node, which is connectable via the bus structure to further equal coating functional units and other components of the system. The configuration of the different system components as network nodes again increases the flexibility regarding the amount of coating devices and monitoring and control alternatives, since further system components in the form of additional network nodes can be easily integrated into the network, which in turn do not require the integration of a control system but which are decentrally controlled functional units. By cooperation of the system components, a functionality results which is considerably above the sum of individual components (synergy).

The network nodes are LON nodes, which are connected in a LON network (LON: Local Operating Network). A LON network is one of a variety of known network configurations, which according to the findings of the inventors are especially suitable for the use in coating systems and which were therefore chosen in this case.

A LON network consists of a plurality of individual nodes, a transmission line and a "data protocol", which defines the rules for the data exchange via this line. The combination of line and data protocol is also termed as bus. LON nodes are self-intelligent, they are capable of self-registering in the network and informing other nodes about their function, as well as adapting themselves to the configuration of the entire system and re-programming themselves accordingly. A superordinate (hierarchic) control is not required for that purpose.

The invention will now be described by way of the example of an electrostatic powder coating system with reference to the drawings:

FIG. 1a schematically shows a powder spray system according to the prior art;

FIG. 2b shows a modified embodiment of the control system of FIG. 2a;

Figure 1A:
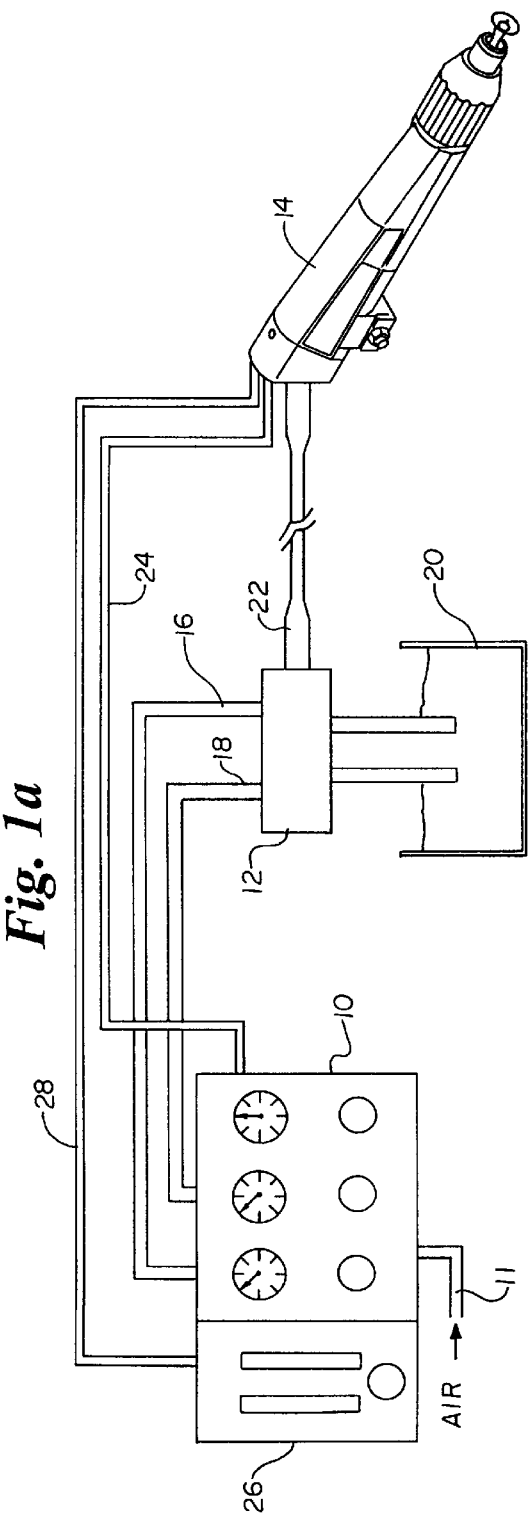
FIG. 1b shows a control system according to a first embodiment of the invention.

FIG. 1a schematically shows a powder coating apparatus comprising a control system according of the prior art. The main components of this coating apparatus are an analog control device 10, a feed injector 12, and a spray gun 14. The control device receives pressurized air via a line 11 and sets the air pressure for the feed air and the dosing air of the supply injector 12 as well as the atomizing air of the spray gun 14, and displays these magnitudes. The supply air and the dosing air are supplied to the feed injector 12 via a supply air line 16 and a dosing air line 18, said feed injector taking-in coating powder from a powder reservoir 20 and generating a powder-air-mixture, which is transported via a supply line 22 to the spray gun 14. The atomizing air is directly guided through an atomizing air line 24 from the control device to the spray gun. The powder reservoir comprises a (not shown) fluidizing means and a fluidizing air inlet.

Additionally, a current/voltage control unit 26 is accommodated within the control device 10, said current/voltage control unit transmitting a control signal via a line 28 to the spray gun 14 to generate the potential required for the electrostatic powder coating.

During operation of the described powder coating apparatus, basically seven operating parameters have to be set and monitored on which the coating quality depends and which are partially interactive. These operating parameters are: feed air, dosing air, atomizing air, high voltage and current of the high voltage generator, powder level in the reservoir and fluidizing air.

Since in practical application all these operating parameters have to be set and monitored by unskilled workers, there is a high likelihood of operating errors. In order to achieve good coating results, special expert knowledge is required for the setting.

Figure 1B:
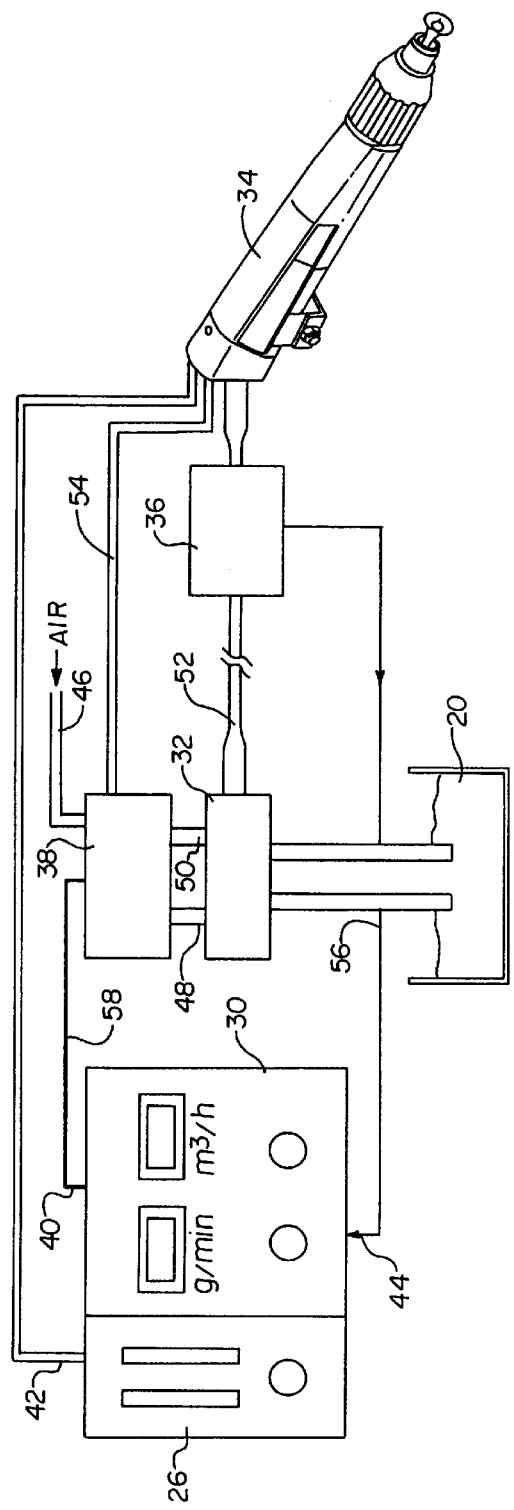

FIG. 1b shows a first embodiment of the control system of the invention. The control system substantially consists of a digital control device 30 having a current/voltage control unit 26, a feed injector 32, a spray gun 34, a powder quantity measuring means in the form of a powder quantity sensor 36 and a powder quantity control means in the form of a proportional valve unit 38.

The digital control device 30 has a signal control output for outputting control signals to the proportional valve unit 38 and a voltage signal output 42 for outputting a voltage control signal to the spray gun 34. The spray gun contains a (not shown) high voltage generator. The control device has a signal input 44 for a feed-back signal from the powder quantity sensor 36. Furthermore, the proportional valve unit 38 is supplied by an air supply line 46, which branches into a feed air line 48 and a dosing air line 50 to set and control the powder-air mixture output by the injector.

The control system of the powder coating apparatus shown in FIG. 1b could be structured by converting a known apparatus according to FIG. 1a, by replacing the analog control device 10 by the digital control device 30, by attaching the proportional valve unit 38 to the or in the proximity of the injector 32, and by mounting the powder quantity sensor 36 into the powder supply 52 for each spray gun 34 preferably as close as possible to the spray gun.

In the arrangement shown in FIG. 1b, the powder-air mixture generated by the injector 32 is detected by the powder quantity sensor 36 which outputs a respective signal via the line 56 to the digital control device 30. This control device sends via line 58 a control signal to the proportional valve unit 38 for setting the feed air and the dosing air to automatically control the powder-air mixture.

Contrary to FIG. 1a, no pressurized air lines lead from the control device 30 to the injector 32 and to the spray gun 31. The powder quantity sensor 36 and the proportional valve unit 38 are connected to the digital control device 30 only through the signal lines 56, 58, through which electric, digital control signals are transmitted and which are, although shown as seperate lines, according to the present invention are combined in a bus structure, as will now be described in detail.

Figure 2A:
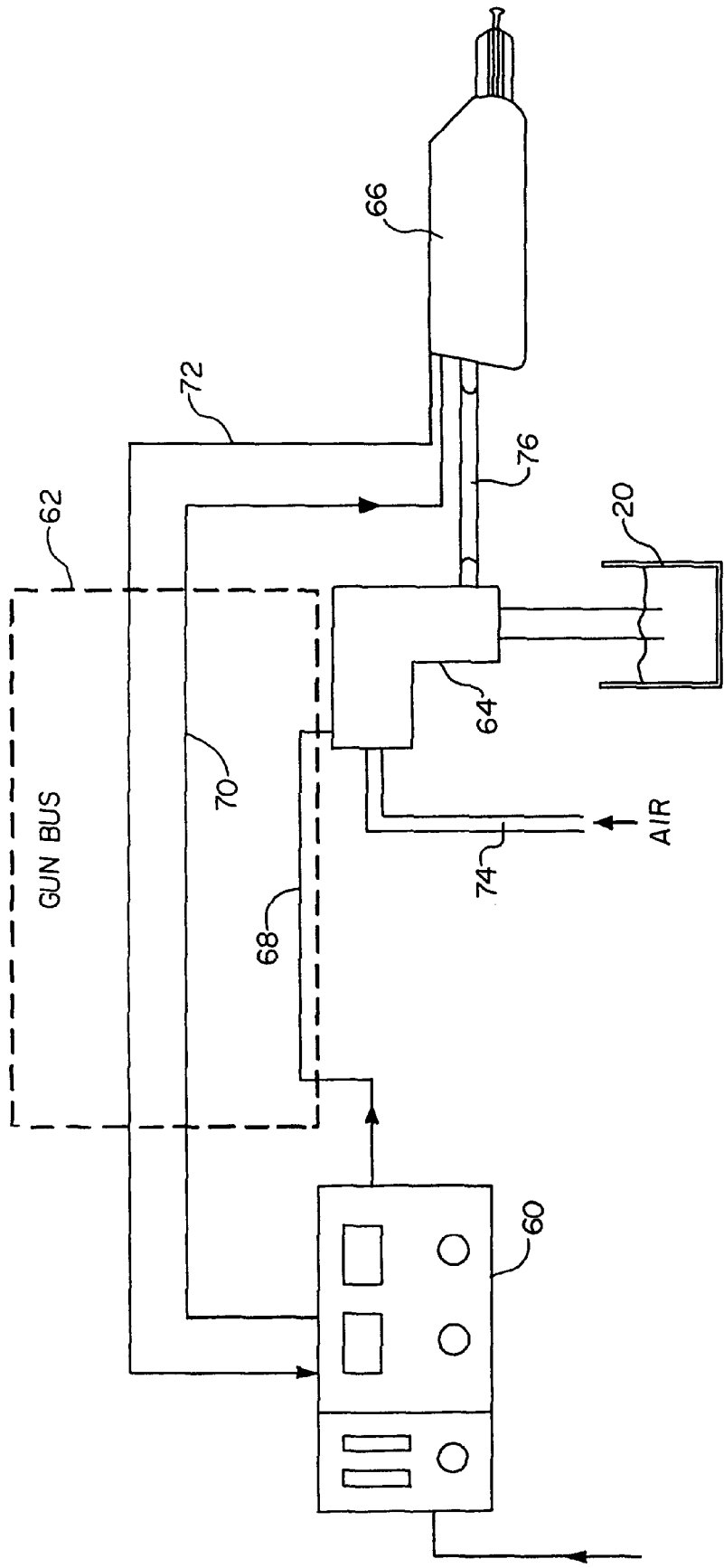
FIG. 2a shows a control system according to a second embodiment of the invention.

FIG. 2a schematically shows a further embodiment of the present invention, in which the proportional valve unit is integrated into the injector 64 and the powder quantity sensor is integrated into the spray gun 66. A technically equal result is obtained if the proportional valve unit and the powder quantity sensor are arranged in direct proximity of the injector 64 and the spray gun 66, respectively.

FIG. 2a only shows schematically the digital control device 60, which basically corresponds to the control device 30 of FIG. 1b. The control device 60 is connected via a gun bus 62 to the injector 64 and the spray gun 66. In the illustration of FIG. 2a, the individual control lines 68, 70 from the digital control device 60 to the injector 64 and the spray gun 66, respectively, and a further line 72 from the spray gun 66 back to the digital control device 60 are shown. These lines are combined to form the gun bus 62; the arrows point in the respective direction of the signal propagation.

The injector 64 has only one central air supply 74 and only one input for the electronic control. A powder supply line 76 leads from the injector 64 to the spray gun.

The function of the system shown in FIG. 2a is basically equal to that of FIG. 1b. This function is, however achieved by less individual components, thus further reducing the expenditure for the connection of signal lines and the laying of air lines.

Figure 2B:
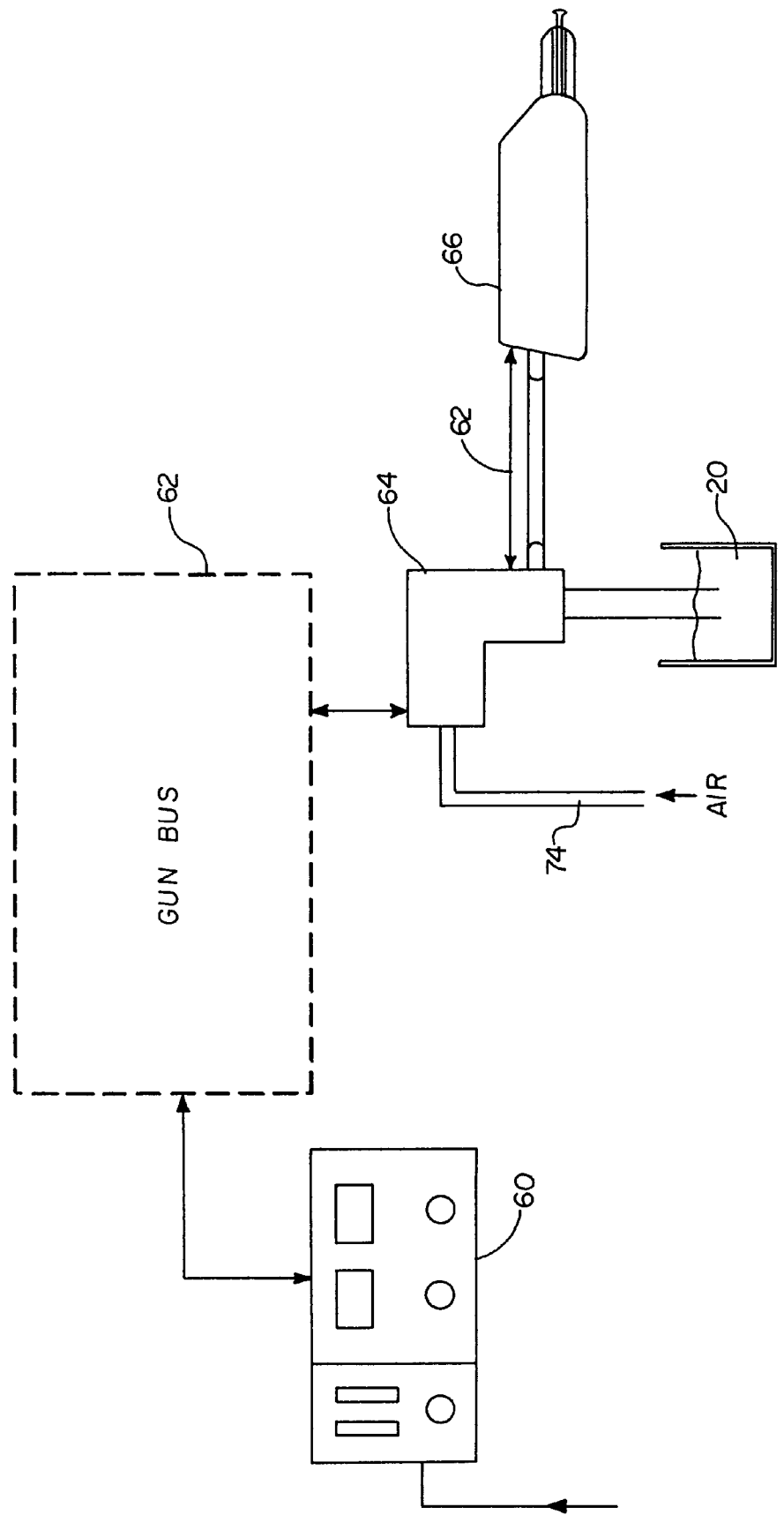

A further embodiment of the system according to the invention is shown in FIG. 2b, wherein in FIGS. 2a and 2b the same components are designated by the same reference numerals.

In the control system according to FIG. 2b, no individual lines for the signal transmission are shown; the entire electric signal transmission is carried out through the gun bus 62, 62'. This gun bus extends from the control device 60 to the injector 64 and from there to the spray gun 66. The signal transmission via the gun bus 62 is bi-directional.

The gun bus 62, 62' is a LON bus, and the proportional valve unit and the powder quantity sensor are configures as LON nodes which receive and send digitally encoded signals, as described in more detail below with reference to FIG. 5.

Figure 3:
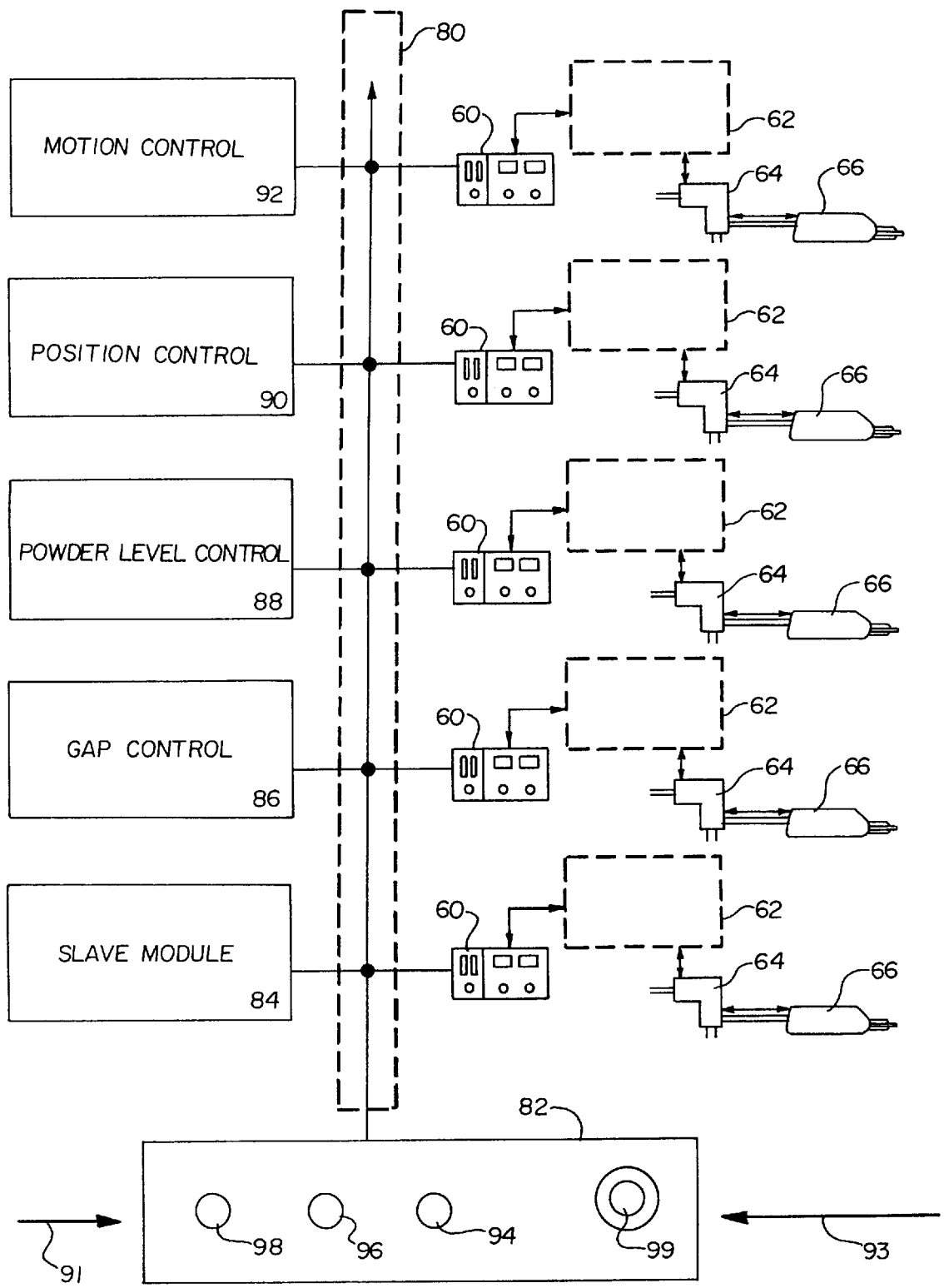
FIG. 3 shows a powder coating apparatus comprising a control system of the invention.

A further embodiment of a control system for a powder coating apparatus according to the invention is shown in FIG. 3.

In FIG. 3, on the right hand side, a plurality (five) of coating modules are shown, each consisting of a control device 60 each, an injector 64 with an integrated closed-loop control unit and a spray gun 66 with an integrated powder quantity sensor, which are connected to one another through a gun bus 62. These coating modules 60 to 66 form self-sufficient, self-controlling functional units, which receive their respective control signals from the digital control device 60. Target values and information about the operating condition of the coating apparatus, necessary for the control, is received by the control device 60 via an internal bus 80.

The internal bus connects a plurality of coating modules 60 to 66 to one another, to the central control module 82 and to further components of the system. Additional modules connectable to the internal bus may be—besides the central control module 82—also a slave control module 84, a gap control module 86, a powder level control module 88, a position control module 90 and a motion control module 92. The bus is designed as a LON bus.

The functions of the individual components basically correspond to those of the known analog systems, however, with the difference that the modules are configured as LON nodes and have a LON interface so that they can be connected to the LON bus 80.

The purpose of the control module 82 is the central supply of the entire powder coating apparatus with the electric power (arrow 92 and display lamp 98) and pressurized air (arrow 93 and display lamp 94). The display lamp 96 displays the off/on condition of the main motion functions of the spray guns 66. Furthermore, the central control module 82 has an emergency-off switch 99 with an alarm means in order to turn the entry system off by a central station in case of a malfunction.

Optionally, the central control mode 82 may contain a memory for the recording of a history of process parameters and the storing of target values that can be called from the memory.

The slave control module 84 includes an additional power unit and is used in the event of an extension of the entire system. When implementing the invention in practical application, the central control module 82 can supply e.g. up to 24 spray guns with electric power and pressurized air. If more than 24 spray guns shall be connected within one powder coating apparatus, the slave control module 84 takes over supply thereof, wherein, however, the emergency-off function for the entire system remains with the central control module 82.

The gap control module 86 serves for turning off the spray guns in the gaps between the workpieces 200 or workpiece elements conveyed past the coating apparatus. The powder level control module 88 monitors the level in a powder coating reservoir and adjusts it to a constant value for even powder supply. The position control module 90 controls the position of the spray guns in the z-direction in accordance with the thickness of the workpiece 200 to be coated, in order to permanently keep an optimum distance from the spray gun 66 to the workpiece 200. The motion control module 92 controls the up and down movement of the spray gun 66 in accordance with the height of the workpiece 200 to be coated.

The system shown in FIG. 3 is easily extendible and changeable due to its decentralized bus structure, where further coating modules and other additional modules can be coupled to the bus. The individual components, which are configured as LON nodes, can register in the system themselves, detect different system components, adjust themselves thereto and communicate therewith. When coupling or de-coupling individual components, a re-programming of the other components is not necessary, since each LON node is capable of informing the LON network about its function and is capable of detecting the encodes signals determined for the respective LON node.

Figure 4:
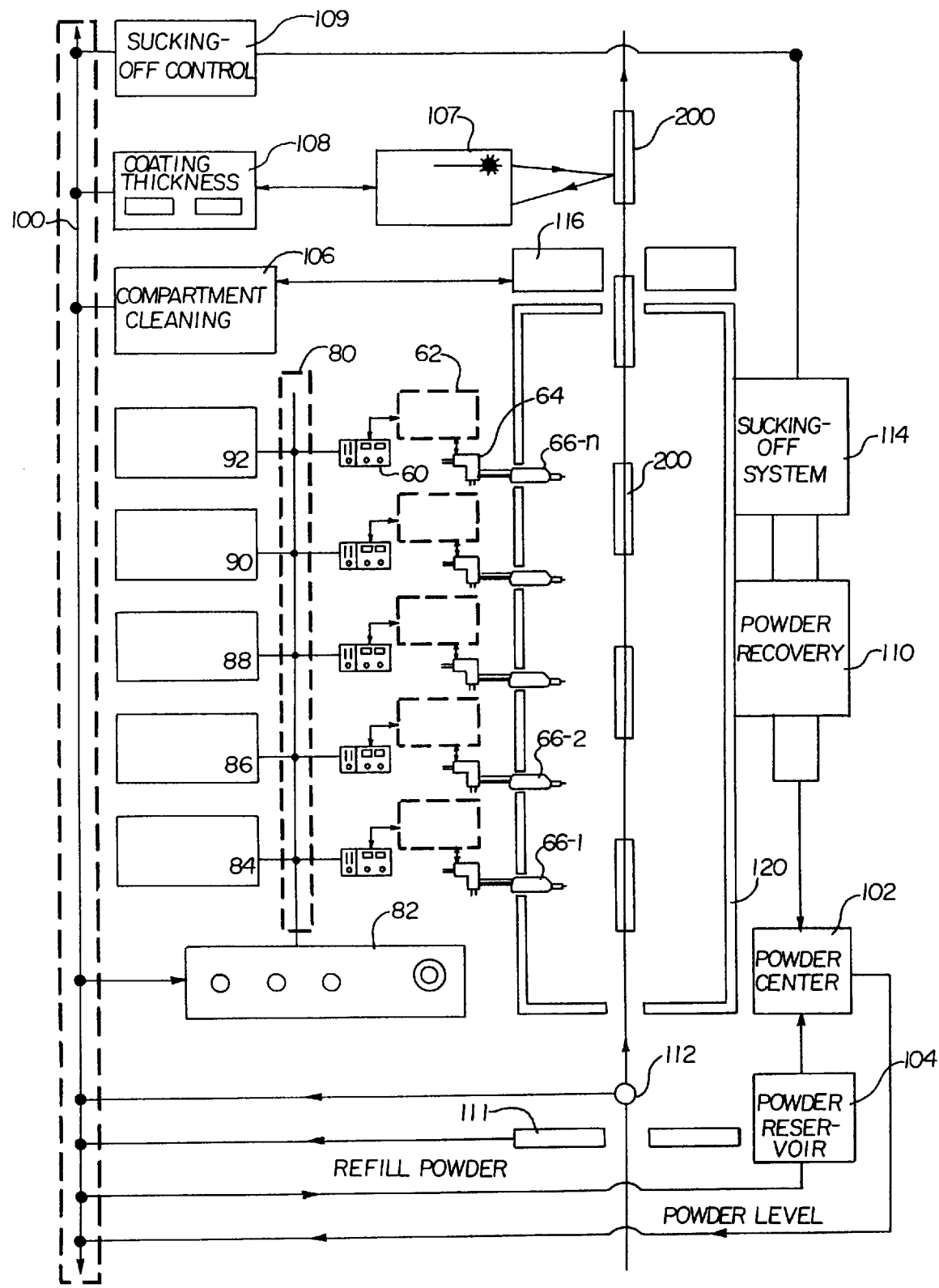
FIG. 4 shows an extended powder coating apparatus comprising a control system of the invention.

FIG. 4 shows a further extended powder coating apparatus, in which further components are coupled via a third or external bus 100, which occur in larger powder coating apparatus. These further components are also connected to the central control module 82 via the external bus 100. They comprise in the shown example a powder center 102 having a powder reservoir 104 and a powder level probe 105, a cleaning control module 106 for the automatic cleaning of the coating cabin, a layer thickness measuring and control unit 108 and an air quantity control means 109 for a powder recovery system 110, a workpiece detection module 11 and a conveyor clock generator 112. The central control module 82 connects the external and the internal bus, which basically have the same function and form one bus structure. The external bus 100 is also a LON bus.

The operation of the powder coating apparatus shown in FIG. 4 is as follows: A workpiece 200 approaches the coating compartment 120 and is detected by the workpiece detection module 111. The workpiece detection module 111 detects that a workpiece 200 approaches and detects the kind, in particular the size and shape, of the workpiece 200. This information is passed onto the bus 100, 80 and is immediately available for all other components of the powder coating apparatus. Thereby, the different components, such as spray guns 66, digital control device 60, motion module 92, position control module 90 etc. are prepared for operation. The speed of the workpiece is detected by means of a conveyor clock predetermined by a conveyor clock generator 112 and is also supplied to the bus 100, 80. Thus, the different components of the system "know" when the workpiece 200 will arrive.

Upon arrival of the workpiece 200, the first spray gun 66-12 starts spraying, wherein it is known, due to the workpiece and speed information, which position in the z-direction, i.e. which distance to the workpiece 200 the spray gun must have, which stroke movement (up and down) the spray gun has to make, and where workpiece gaps are at which the spray gun has to be turned off etc. The digital control device associated to the spray gun 66-1 supplies the information that the gun sprays or does not spray to the bus 80, so that the individual spray guns 66-1 to 66-n can be synchronized. The powder quantity discharged is controlled within each coating unit 60-66, wherein in accordance to the workpiece to be coated different colors and different target values can be predetermined for the powder quantity discharged. These parameters and definitions are stored in the central control module 82 or in each digital control device 62 and they are called-in in accordance with the workpiece 200 detected.

In the system shown in FIG. 4, the automatic control of the powder coating thickness on the workpiece 200 is possible via the internal bus 100 by the aid of the coating thickness control module 108 and a layer thickness sensor 107. The suction system 114 can be controlled by the air quantity control means 109 in order to optimize the efficiency of the recovery apparatus 110, if in accordance with the shape of the workpiece to be coated more or less excess powder is to be sucked-off. Fully automatic cleaning of the coating cabin of the system is possible in a program-controlled manner through the cleaning control mode 106 and an automatic cleaning means 116.

Figure 5:
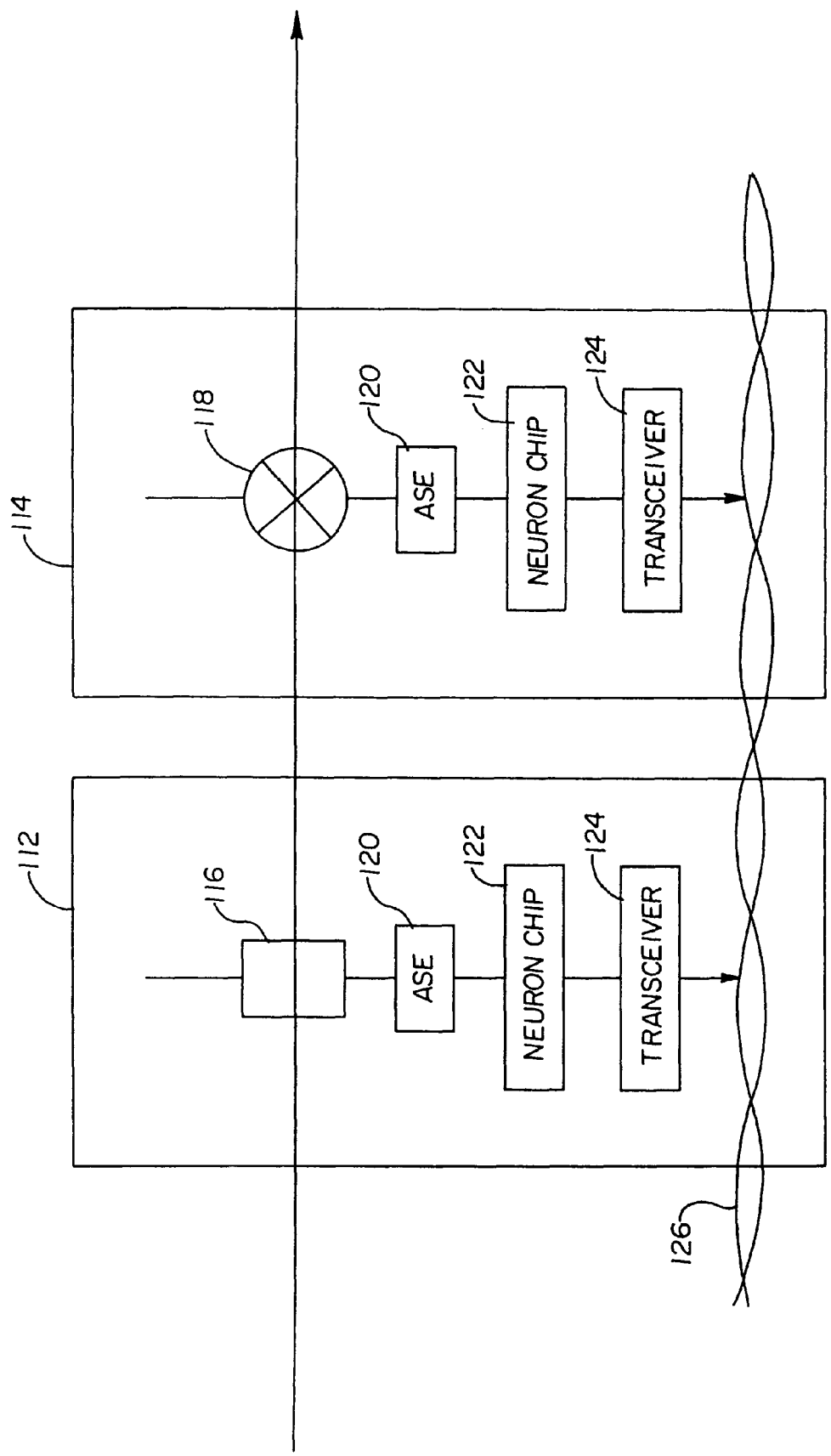
FIG. 5 shows examples for two nodes of the control system according to the invention.

Two examples for the connection of individual components to the bus structure in the form of LON nodes are shown in FIG. 5.

The left side of FIG. 5 shows the scheme of an air quantity sensor node 112 and the right side of FIG. 5 shows the scheme of a proportional valve node 114. The LON nodes 112, 114 are composed of a sensor, such as the air quantity sensor 116 or an actuator, such as the proportional valve 118, an application-specific electronics 120, a neuron chip 122 and an adapter or transceiver 124.

The transceiver 124 serves as an interface for connecting the respective LON node with the LON bus, which in this case is shown as a two-wire communications line 126. The neuron chip 122 forms the interface between the transceiver and the application-specific electronics 120 and has the function to configure the LON nodes 112 or 114 in a manner that the same data format and data transmission protocol can always be used for the communication between the relevant LON node and the digital control device 30 or the other nodes of a LON network.

An 8-bit microcontroller can e.g. be provided within the neuron chip for application and control functions, said microcontroller being capable of being programmed in e.g. the language neuron-C compatible to the ANSI-C language, so that intelligence can be provided in each node.

The other components of the powder coating apparatus connected to the internal or external bus 80, 100 as well as the air quantity sensor node 112 and the proportional valve node 114 can be configured such that a uniform bus data protocol can be used for each group of the connected similar nodes.

The above-described control system leads to the following advantages: the control system offers a fully automatic control of the essential magnitudes important for the coating, wherein the necessity for expert knowledge in the setting of the apparatus is minimized by permanent automatic apparatus optimization.

Since all important coating parameters are permanently detected automatically, the possibility of the complete process documentation results.

The automatic coating thickness control enables the keeping of very small tolerance values.

Despite the considerable improvement of the apparatus efficiency achieved, the operating staff can still be reduced.

By avoiding or at least reducing the setting and optimizing times, the effective production time of the apparatus rises.

Changes can be made locally without the entire system having to be newly programmed when individual components must be exchanged or added.

The modular system structure enables the customer to arrange and unproblematically extend an apparatus according to his requests.

For the conversion of an existing conventional SPC control system, hybrid controls can be used in a transition period, said controls using the SPC system in combination with the LON network for only some functions.

The "intelligence" installed locally by the LON nodes makes it possible to equip the different apparatus components with additional test mechanisms, which automatically perform local tests. Aging phenomena can be determined through the apparatus behavior and other components can be informed of these aging phenomena via the network. Also other functional condition of the sensors and actuators can be determined in a similar form and upon need, a remote diagnosis can be made per modem. Errors can be localized via the telephone line down to the sensor/actuator level. Updates and upgrades of the control software can be programmed by telephone into the components prepared for that purpose.

The features disclosed in the above description, in the claims and in the drawings can be meaningful individually and in any combination for realizing the invention in the different embodiments. The invention is in particular suitable also for electrostatic powder coating apparatus and for wet lacquer apparatus.

We claim:

1. A control system of a coating apparatus for a coating medium, such as powder or lacquer, comprising at least one coating device, in which a quantity measuring means (36) for determining the amount of coating medium supplied to the coating device, a quantity control means (38) for setting the quantity of the coating medium to be discharged by the coating device, and a digital control device (60) for controlling the operation of the coating device are associated to the coating device (34, 66), wherein the quantity measuring means (36) and the quantity control means (38) form one network node (112, 114) each, which is connected to the digital control device (60) via a bus structure (62), wherein the network nodes are local operating network nodes.

2. A system according to claim 1, characterized in that each network node comprises at least one of a sensor (116) and an actuator (118), together with an application-specific electronics (120), a control component (122), and an interface (124) for the connection with the bus structure (62, 80; 126).

3. A system according to claim 1, characterized in that the quantity measuring means (36) and the quantity control means are connected to the digital control device (6) via a first local operating network bus (62) and are controllable.

4. A system according to claim 1, characterized in that a plurality of coating devices (66) exist, that the quantity measuring means, the quantity control means and the digital control device (6) belonging to one coating device are connected to one another via a first local operating network bus (62) and form a further local operating network node, which is connected to a central control unit (82) via a second local operating network bus (80).

5. A system according to claim 4, characterized in that the central control unit (82) comprises a central control means for the supply of the coating apparatus with pressurized air and electric current, and that the central control unit comprises an emergency turn-off means.

6. A system according to claim 4, characterized by a display means for at least one of operating parameters.

7. A system according to claim 4, characterized by the following further components which are connectable to the bus structure (62, 80; 126): a gap control means (86), a reservoir control means (88) for the coating medium, a position control means (90) and a motion control means (92) for at least one of the coating devices (66) and/or a slave control means (84), wherein the further components are provided as network nodes.

8. A system according to claim 4, characterized by the following further components which are connectable to the bus structure (62, 80; 126): a recovery control means and a supply control means for the coating medium, a workpiece detection means, a conveyor clock control means, at least one of a cleaning means and a coating thickness measuring means, wherein the further components are provided as network nodes.

9. A system according to claim 4, characterized by a memory means for the operating parameters.

10. A system according to claim 4, characterized by a program computer, coupled to the bus structure to perform at least one of: a) input target values for the operating parameters and b) monitor the operation of the coating apparatus.

11. A system according to claim 10, characterized in that the program computer can be coupled via a modem.

12. A system according to claim 1, characterized in that the quantity measuring means is associated with the coating device (66).

13. A control system of a coating apparatus for a coating medium such as powder or lacquer, comprising at least one coating device, in which a quantity measuring means (36)

for determining the amount of coating medium supplied to the coating device, a quantity control means (38) for setting the quantity of the coating medium to be discharged by the coating device, and a digital control device (60) for controlling the operation of the coating device are associated to the coating device (34, 66), wherein the quantity measuring means (36) and the quantity control means (38) form a network node (112, 114) each, which is connected to the digital control device (60) via a bus structure (62), wherein the quantity measuring means, quantity control means and the digital control device (60) associated to one coating device each together form a further network node, which is connected to a central control unit (82) via the bus structure (62, 80; 126), and wherein the network nodes are local operating network nodes.

14. A control system according to claim 13, characterized in that each network node comprises at least one of a sensor (116) and an actuator (118), together with an application-specific electronics (120), a control component (122), in particular a neuron chip, and an interface (124) for the connection to the bus structure (62, 80; 126).

15. A system according to claim 13, characterized in that a plurality of coating devices are provided wherein the associated network nodes of said coating device are connected to the central control unit (82) via a second local operating network bus (80).

16. An electrostatic powder coating apparatus, comprising at least one coating device for a coating medium, such as powder or lacquer, and comprising a control system, in which a quantity measuring means (36) for determining the amount of coating medium supplied to the coating device, a quantity control means (38) for setting the quantity of the coating medium to be discharged by the coating device, and a digital control device (60) for controlling the operation of the coating device are associated to the coating device (34, 66), wherein the measuring means (36) and the quantity control means (38) form a network node (112, 114) each, which is connected to the digital control device (60) via a bus structure (62), wherein the quantity measuring means, quantity control means and the digital control device (60) associated to one coating device each together form a further network node, which is connected to a central control unit (82) via the bus structure (62, 80; 126), and wherein the network nodes are local operating network nodes.

17. An apparatus according to claim 16, characterized in that the operating parameters comprise air quantity, in particular supply air, dosing air and atomizing air, powder quantity and speed as well as current and voltage values.

18. An apparatus according to claim 16, characterized in that the quantity control means (64) comprises an air supply line (46), a proportional valve unit (38) and an injector (32) for controlling the powder quantity for the respective coating device.

19. An apparatus according to claim 18, characterized in that the proportional valve unit (38) comprises at least two proportional valves for setting the feed air and the dosing air of the respective coating device (34).

* * * * *

UNITED STATES PATENT AND TRADEMARK OFFICE
CERTIFICATE OF CORRECTION

PATENT NO : 6,059,884
DATED : May 9, 2000
INVENTOR(S) : Kurt Seitz, Horst Adams, Markus Hasler It is certified that error appears in the above-identified patent and that said Letters Patent are hereby corrected as shown below:

The Assignee is incorrectly listed as Mirror & Pictures Vermarktungs und Handels GmbH, Gotting Germany.

The correct Assignee is Wagner International AG, Alstatten, Swizerland .

Signed and Sealed this

Tenth Day of April, 2001

*Attest:*

NICHOLAS P. GODICI

*Attesting Officer*   *Acting Director of the United States Patent and Trademark Office*